E. POWELL.
FENCE-POST.

No. 174,296. Patented Feb. 29, 1876.

WITNESSES:
Chas. Nida
Alex F. Roberts

INVENTOR:
Eugene Powell
BY
ATTORNEYS.

UNITED STATES PATENT OFFICE.

EUGENE POWELL, OF DELAWARE, OHIO.

IMPROVEMENT IN FENCE-POSTS.

Specification forming part of Letters Patent No. 174,296, dated February 29, 1876; application filed December 11, 1875.

*To all whom it may concern:*

Figure 1:
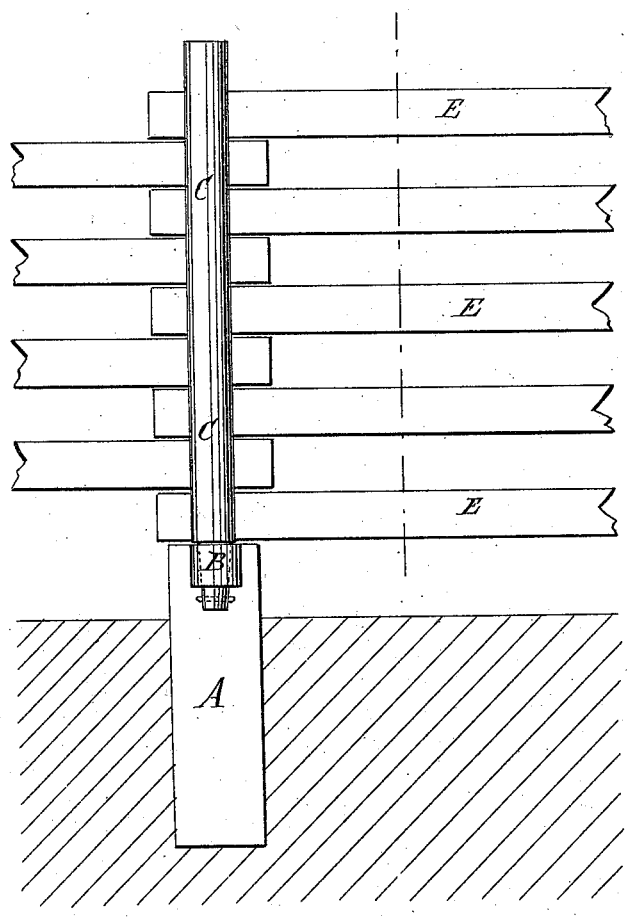
Figure 2:
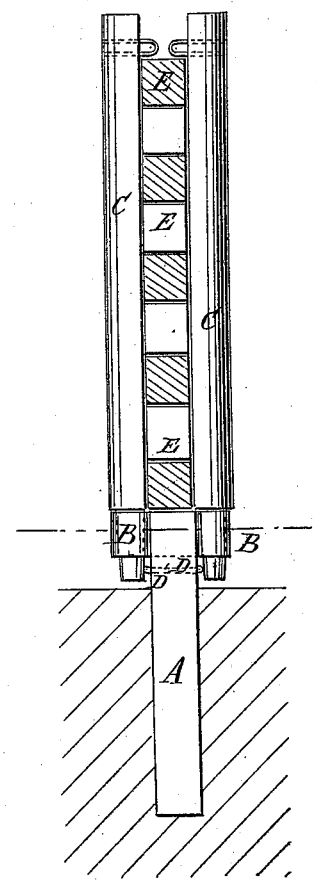
Figure 3:
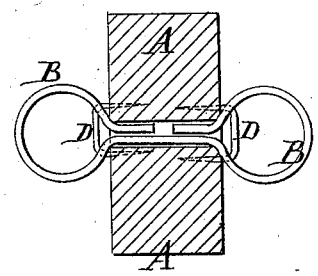

Be it known that I, EUGENE POWELL, of Delaware, in the county of Delaware and State of Ohio, have invented a new and useful Improvement in Wood Stools for the Stakes of Straight Rail-Fences, of which the following is a specification:

Figure 1 is a side view of one of my improved stools, shown as applied to a fence. Fig. 2 is a vertical section taken through the line $x\ x$, Fig. 1. Fig. 3 is a horizontal section of the stool, taken through the line $y\ y$, Fig. 2.

Similar letters of reference indicate corresponding parts.

The object of this invention is to furnish an improved stool for the stakes of straight rail-fences, which shall be so constructed as to hold the fence firmly and securely.

The invention consists in the stool formed by the combination of the wooden block, set on end, provided with side stakes, attached thereto by means of bolts, spikes, or the cross-head, having eyes formed in it at the opposite sides of the said block, and the staples, with each other, to adapt it to receive the ends of the stakes of a straight rail-fence, as hereinafter fully described.

A are wooden blocks, which are made of such a length as to enter the ground about two feet. The upper ends of the blocks A are notched transversely to receive the cross-head B, which is made of wrought-iron, bent to form eyes, which project upon the opposite sides of the block A, to receive the sharpened ends of the stakes C. D are staples, which are driven into the sides of the block A, a little below the eyes of the cross-head B, for the inner sides of the ends of the stakes C to rest against to secure them more firmly in place. The ends of the rails E of the adjacent panels are placed alternately between the stakes and one upon the other. The upper ends of the stakes C are secured to each other by staples and a wire, or by other convenient means.

Having described my invention, I claim as new and desire to secure by Letters Patent—

The combination of top-notched wooden blocks A, cross-heads B, resting in said notches, and having an eye projecting on each side of block, and the stakes C C, having tenons to fit in said eyes, all arranged substantially as and for the purpose specified.

EUGENE POWELL.

Witnesses:
T. W. POWELL,
ELIZABETH POWELL.